Patented Apr. 5, 1949

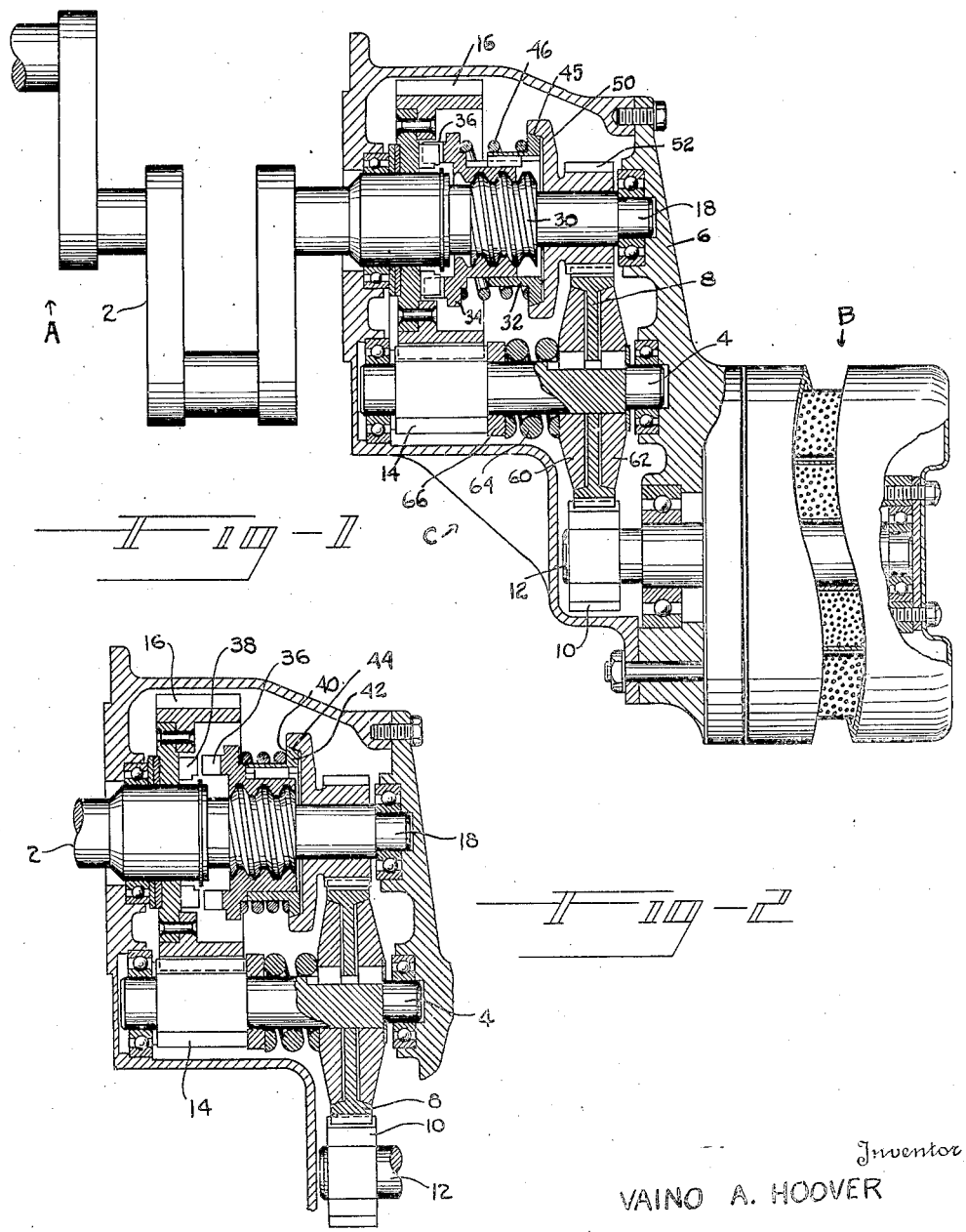

2,466,427

UNITED STATES PATENT OFFICE 2,466,427

STARTER-GENERATOR GEARING

Vaino A. Hoover, Los Angeles, Calif., assignor to Electrical Engineering and Manufacturing Corporation, Los Angeles, Calif., a corporation of California Application March 13, 1947, Serial No. 734,332

2 Claims. (Cl. 74—6)

This invention relates in general to devices and systems for starting an internal combustion engine and for generating electric energy during the operation of the engine by power derived therefrom.

Combined starting and generating devices for use with internal combustion engines are now well known. These devices comprise, in general, an electric machine and gearing connecting the machine to the crankshaft of an internal combustion engine, the gearing being operable to effect a speed reduction when the electric machine is driving the crankshaft to start the engine, and being operable to cause the electric machine to be driven at a suitable speed when the engine has started and is driving the electric machine as a generator. While such devices have heretofore been most widely used on automobiles they are useful with all internal combustion engines, regardless of the use or type thereof and are, of course, useful on aircraft. In this latter field of use, however, rigid standards of weight, reliability and simplicity are imposed which have not heretofore concerned those skilled in this art and it has been found that many known devices are entirely unsuited to aircraft use.

It has been the principal object of this invention to provide a device of the described type but of much simpler construction than known devices, which will be completely automatic in operation, and which will incorporate new and improved means for preventing damage to the parts by reason of backfiring of the engine.

These objects and others inherent in the invention have been realized by this invention and are incorporated in an embodiment thereof which is disclosed in the following description and the annexed drawings. The disclosure of this preferred embodiment is for purposes of illustration of the invention only, and imposes no limitations on the invention not imposed by the appended claims.

Referring to the drawings, in which similar reference numerals refer to like parts, Fig. 1 is part-sectional view showing partly schematically, an internal combustion engine, an electric machine which is operable to start the engine and is also operable as a generator, and showing more particularly the power-transmitting mechanism connecting the engine and the electric machine, and Fig. 2 is a view showing the power-transmitting mechanism with the parts in the position occupied when the engine is running and the electric machine is generating electric energy.

A preferred embodiment of the invention is disclosed in the drawing in combination with an internal combustion engine A having crankshaft 2, and comprises the electric machine B and the mechanism C for transmitting rotary motion in both directions between the electric machine and the crankshaft of engine A. As stated hereinbefore, the function of the mechanism C is to transmit the rotary motion of the armature of the electric machine to the crankshaft of the engine at a speed less than that of the armature, in order to crank and start the engine and, when the engine has started, to transmit the rotary motion of the crankshaft to the armature of the electric machine at a suitable speed in order to operate the electric machine as a generator.

The power-transmitting device C, which constitutes our invention, comprises a rotatable shaft 4 which is journaled in casing 6 and on which is mounted, by clutch means which will be more completely described hereinafter, a gear 8 which meshes with a pinion gear 10 on the armature shaft 12 of the electric machine. The shaft 4 also carries a pinion gear 14 which meshes with a gear 16 which is freely and rotatably mounted on a rotatable shaft 18. Shaft 18 is journaled in bearings in the casing 6 and one end thereof extends outside the casing and is drivingly connected to the engine crankshaft 2. Within the casing, and on the inner side of gear 16 the shaft 18 has a quick-action thread 30 formed thereon on which is threaded the sleeve part 32 of a nut 34. This nut has an annular series of teeth 36 at one end thereof which are adapted to mesh with corresponding teeth 38 on gear wheel 16 when the nut is sufficiently moved toward the gear wheel by threading along the shaft 18. The sleeve part of the nut is surrounded by the cylindrical part of a clutch member 40 which is keyed to the sleeve part of nut 34 whereby it must rotate with the nut but can move axially thereof, and which has a radially extending clutch part 42 at one end thereof having a clutch face 44 thereon. A coil compression spring 46 surrounds the keyed parts of nut 34 and cylindrical member 40 and normally urges these members apart, whereby the clutch face 44 is normally held in engagement with a corresponding clutch face 45 on a disc 50 which is attached to, or forms part of, a pinion gear 52 which is freely and rotatably mounted on shaft 18.

The gear 8 is connected to shaft 4 by means which normally transmit the rotation of either of these parts to the other but which wil slip in the event of backfire of the engine in order to prevent damage to the parts. Such means comprise two discs 60, 62 which are mounted on shaft 4 on opposite sides of gear 8 and adjacent thereto, and which are keyed to the shaft for rotation therewith. Each disc has a conical surface formed on the outer periphery thereof which is adapted to cooperate with a corresponding surface formed on gear 8. A coil compression spring 64 surrounds shaft 4 and bears at its one end on the outer face of disc 60 and at its other end against a washer 66 on shaft 4. This spring constantly urges the conical surfaces on discs 60, 62 and gear 8 into tight engagement whereby rotation of either the shaft or gear is imparted to the other.

The operation of the mechanism will now be described. When the engine is at rest and is to be started, the parts being in the positions shown in Fig. 2, energy is supplied to the electric machine B causing the armature thereof to rotate. This rotary movement is transmitted to the gear 16 through shaft 12, pinion 10, gear 8, shaft 4 and pinion 14. The rotation of gear 8 will start the movement of part 40 through friction on the faces 44, 45 and thereby moves the sleeve nut 34 axially into contact with the teeth 38 on gear 16. As soon as this contact is established, gear 16 being driven by pinion 14 pulls the sleeve nut 32 tightly against itself, thereby disconnecting clutch faces 44, 45, and locking itself tightly onto shaft 18. The shaft 18 will be rotated at a speed less than that of the armature of the electric machine because of the interposition of the reduction gearing, thereby starting the engine.

When the engine starts, the rotation of the crankshaft will be transmitted to shaft 18, causing it to rotate at a higher speed than previously and thus producing a relative rotation between the shaft and nut 34 which causes the nut to move along the threads 30 to the right as shown in the drawings. This movement of the nut will cause the teeth 36, 38 to become disengaged and will compress the spring 44, causing the clutch member 42 to be pressed into tight engagement with pinion disc 50. The rotation of shaft 18 at the high speed of the crankshaft will now be transmitted through threading 30, nut 34, clutch member 42, pinion disc 50, pinion gear 52, gear 8, pinion gear 10 and shaft 12 to the armature of the electric machine. The disengagement of teeth 36 and 38 will disconnect gear 16 from shaft 18 and, while this gear will be rotated by pinion gear 14 when the crankshaft is driving the armature of the electric machine, it will merely idle on shaft 18.

In the event that the engine backfires while being started, the crankshaft will first stop rotating and then rotate in a reverse direction. This reverse rotation will be transmitted to shaft 4 through shaft 18, threads 30, nut 34, teeth 36, 38, gear 16 and pinion gear 14, tending to turn gear 8 in the same reverse direction. The armature of electric machine B, due to its inertia, will continue to rotate in the original direction and the frictional connecting devices 60, 62 which normally drivingly attach gear 8 to shaft 4 will accordingly be overloaded and will slip until the energy of the rotating armature is spent, thereby protecting gear 8 and pinion 10 from breakage.

While we have described and illustrated but one embodiment of our invention, it will be apparent to those skilled in the art that other embodiments, as well as modifications of that disclosed, may be made without departing in any way from the spirit or scope of the invention, for the limits of which reference must be had to the appended claims.

What is claimed is:

1. An apparatus for drivingly connecting the rotor of an electric machine to an internal combustion engine to start the same and thereafter drivingly connect the engine to the rotor to generate electricity, comprising, a rotatable shaft adapted to be drivingly connected to the crankshaft of an engine and having a quick-action thread formed thereon, a reduction gearing having an input gear adapted to be drivingly connected to the rotor of the electric machine and an output gear freely and rotatably mounted on said shaft and having an annular series of teeth thereon, a nut threaded to said shaft and having teeth adapted to co-operate with those on said output gear to transmit the rotation of said output gear to said shaft to rotate the same to start the engine, a pinion gear freely and rotatably mounted on said shaft and having a clutch member attached thereto for rotation therewith, a second clutch member co-operable therewith and mounted on said nut for rotation therewith and axial movement with respect thereto, and a compression spring between said nut and said second clutch member and constantly urging the second clutch member toward the first clutch member.

2. An apparatus according to claim 1, comprising in addition a shaft on which the input gear of the reduction gearing is mounted, and a frictional connecting device normally drivingly connecting said shaft and input gear.

VAINO A. HOOVER.

REFERENCES CITED

The following references are of record in the file of this patent:

UNITED STATES PATENTS

| Number | Name | Date |
|---|---|---|
| 1,441,418 | Halbleib | Jan. 9, 1923 |

FOREIGN PATENTS

| Number | Country | Date |
|---|---|---|
| 687,056 | France | Apr. 22, 1930 |